United States Patent [19]

Lebowsky et al.

[11] Patent Number: 5,432,716
[45] Date of Patent: Jul. 11, 1995

[54] METHOD AND APPARATUS FOR FILTERING SIGNALS

[75] Inventors: Fritz Lebowsky, Freiburg; Hans-Werner Peters, Raisdorf, both of Germany

[73] Assignee: Linotype-Hell AG, Eschborn, Germany

[21] Appl. No.: 107,798
[22] PCT Filed: Feb. 8, 1992
[86] PCT No.: PCT/DE92/00082
   § 371 Date: Aug. 20, 1993
   § 102(e) Date: Jan. 13, 1994
[87] PCT Pub. No.: WO92/15070
   PCT Pub. Date: Sep. 3, 1992

[30] Foreign Application Priority Data

Feb. 22, 1991 [DE] Germany ............ 41 05 517.9

[51] Int. Cl.$^6$ ............................. H04N 5/911
[52] U.S. Cl. ................... 364/572; 348/607; 348/668; 364/574
[58] Field of Search ............ 348/384, 607, 609, 610, 348/668; 364/572, 574; 382/54

[56] References Cited

U.S. PATENT DOCUMENTS

| | | | |
|---|---|---|---|
| 4,074,321 | 2/1978 | Miller | 348/665 |
| 4,573,070 | 2/1986 | Cooper | 358/36 |
| 4,573,075 | 2/1986 | Bolger | 358/167 |
| 4,747,156 | 5/1988 | Wahl | 382/54 |
| 4,803,547 | 2/1989 | Stratton | 348/668 |
| 4,809,238 | 2/1989 | Bishop et al. | 367/46 |
| 4,847,682 | 7/1989 | Tsinberg et al. | 358/31 |
| 4,882,627 | 11/1989 | Keesen et al. | 358/166 |
| 4,951,129 | 8/1990 | Lang | 348/609 X |
| 4,961,113 | 10/1990 | Okada et al. | 358/167 |
| 4,979,023 | 12/1990 | Tsinberg et al. | 358/31 |
| 5,218,649 | 6/1993 | Kundu et al. | 382/54 |
| 5,237,413 | 8/1993 | Israelsen et al. | 348/607 X |
| 5,327,260 | 7/1994 | Shimomae et al. | 382/54 X |
| 5,351,314 | 9/1994 | Vaezi | 382/54 |
| 5,373,328 | 12/1994 | Hong | 348/668 |

FOREIGN PATENT DOCUMENTS

| | | | |
|---|---|---|---|
| 0051068B1 | 1/1985 | European Pat. Off. | H04N 5/14 |
| 0227848A1 | 7/1987 | European Pat. Off. | |
| 3423112A1 | 1/1985 | Germany | |
| 3412106A1 | 10/1985 | Germany | |
| 3842587A1 | 7/1989 | Germany | |
| 3837329A1 | 5/1990 | Germany | |

OTHER PUBLICATIONS

IEEE Transactions on Circuits and Systems, vol. CAS-34, No. 11, Nov., 1987, "Adaptive Nonlinear Filters For Simultaneous Removal of Different Kinds Of Noise In Images", by Reinhard Bernstein, pp. 1275–1281.
SMPTE Journal, Mar., 1978, vol. 87, "Digital Techniques For Reducing Television Noise", by John P. Rossi, pp. 134–140.
Bild Und Ton 43 (1990), "Noise Filtering In Colour Image", Ing. Petr Kohout, Czechoslovak Academy of Sciences, Institute of Information Theory and Automation, pp. 46 and 47.

Primary Examiner—Edward R. Cosimano
Attorney, Agent, or Firm—Hill, Steadman & Simpson

[57] ABSTRACT

A method and apparatus for filtering signals wherein a signal input to which the input signal is connected connects through a delay unit to a signal output and also connects through a filter branch to the signal output. The filter branch filters out constant parts and high-frequency parts of the input signal by the following steps. First the input signal is band-pass filtered. Thereafter, with a threshold filter, signal parts are eliminated having an amplitude below a prescribable threshold. In a following selector, signal amplitudes are allocated to a quantized, two-dimensional reference plane, and isolated signal parts are eliminated within the reference plane. Finally, a signal reconstruction is implemented by interpolation for coordinates of the reference plane at which a signal amplitude of a filtered signal part is essentially equal to zero.

17 Claims, 3 Drawing Sheets

METHOD AND APPARATUS FOR FILTERING SIGNALS

BACKGROUND OF THE INVENTION

The invention is directed to a method for filtering signals, whereby signal amplitudes can be allocated to a quantized, two-dimensional reference plane, and whereby a filtered signal can be added to an unfiltered input signal for amplification of a useful signal part after constant parts as well as high-frequency parts have been filtered out.

Over and above this, the invention is directed to an apparatus for filtering signals, whereby signal amplitudes can be allocated to a quantized, two-dimensional reference plane, and whereby a separating filter that branches the input signal as well as a frequency-dependent filter arranged in a filter branch are provided.

Such methods and apparatus for two-dimensional filtering of signals to reduce noise are particularly employed in electronic image processing in order to improve the quality of images.

Various methods for two-dimensional filtering are already known from the prior art. EP-A-0 227 848 discloses a method with which isolated, black locations in an image can be eliminated, namely small regions are viewed for this purpose and a determination is made whether a plurality of black points is situated therein whose percentage is higher or lower than a specific, prescribed percentage with reference to the total number of points in this region. When the percentage is higher than the aforementioned limit value; then the black points are left, otherwise, they are converted into white points. This serves the purpose of eliminating black, disturbing points on scanned originals.

DE-A-34 23 112 is concerned with the problem of eliminating weak background noise. In order to reduce this, the signal is first split into two signal paths: the one merely delays the input signal so that it is isochronic to the output signal on the other branch, to which it is subsequently added and as a result whereof the output signal of the arrangement is formed. The following signal editing is carried out in the other branch: the signal initially passes through a band-pass filter that is matched as well as possible to the power spectrum of the image signal. Among other things, this band-pass filter eliminates all low-frequency and constant parts. The output signal of this band-pass filter is subsequently supplied to a threshold switch that allows all the signal parts to pass that are higher than a defined threshold which is dynamically acquired from the image signal, but which blocks all of the signal parts that lie below this threshold. Since these latter signal parts are usually a matter of noise, this leads to a suppression of noise, since such signals are extremely rare in a real image signal. The resulting output signal is then multiplied by a controllable factor and is added to the afore-mentioned input signal that has been looped through with a delay. The reason for the loop-through of the unedited input signal is that, if the above-presented signal processing circuit should happen to lead to excessive image falsification, the influences of these can be limited.

U.S. Pat. No. 4,573,070 is directed to a two-dimensional image filter whose properties are constantly dynamically matched to the respective properties of the image signal that is just present. Since its functioning, however, departs rather substantially from the method of the application, this shall not be discussed in greater detail here.

EP-B-0 051 068 discloses another filter means. It turns out, however, that the known filtering methods and filter devices do not supply satisfactory results, particularly when the amplitude of the useful signal is not clearly higher than the amplitude of superimposed disturbances. This results therein that signals having a low signal-to-noise ratio can only be inadequately filtered. When, given image signals, only weakly demarcated, comparatively regular textures are present on a surface, then it is already not possible to undertake an adequately sharp working-out of the contours limiting the texture elements even given comparatively slight disturbances.

SUMMARY OF THE INVENTION

An object of the present invention is to improve a method of the type initially cited such that a qualitatively high-grade filtering of signals with a low signal-to-noise ratio is enabled. The alone object is inventively achieved in that signal parts having an amplitude below a prescribable threshold are eliminated for filtering the signal after a band-pass filtering, isolated signal parts are subsequently eliminated within the reference plane, and a signal reconstruction is subsequently implemented by interpolation for coordinates of the reference plane at which the signal amplitude of the filtered signal part is essentially equal to zero.

A further object of the present invention is to improve an apparatus of the type initially cited such that it is suitable for the implementation of the method of the invention.

This object is inventively achieved in that the frequency-dependent filter is designed as a band-pass filter which is followed by a threshold filter that is connected in series with a selector that eliminates isolated signal amplitudes and with an interpolator that reconstructs signal curves.

The assistance of the method of the invention and of the apparatus of the invention make it possible an improvement of the image sharpness and to simultaneously compensate an aperture loss that has arisen due to a sampling. The method essentially works as a non-linear aperture correction which reconstructs the image sharpness in the detail signal and implements a reduction of noise parts at the same time. There is a high probability that significant noise parts are initially removed due to the signal parts having an amplitude below a prescribable threshold being filtered out. The subsequent, selective extinction of picture elements also makes it possible to eliminate noise signals having an extremely high amplitude. Useful signal parts with low amplitude that may be potentially eliminated can be reconstructed with high reliability by the interpolation due to the charging with the threshold characteristic line. A signal thus arises in the filter branch that contains all critical contour information and has only slight noise parts. This filtered signal can be added to the unfiltered input signal in a combiner. This both guarantees that all contour information are contained in the output signal and also guarantees that critical contour signal parts leave the apparatus with an amplitude that is higher, relative to the noise part.

It is provided in a preferred embodiment that a two-dimensional interpolation is implemented between amplitude values that are allocated to neighboring coordinates of a signal coordinate whose allocated amplitude is to be reconstructed. What the two-dimensional interpolation achieves is that all signal parts in an immediate environment of a localization to be reconstructed in the region of the reference plane are taken into consideration.

It is provided in another preferred embodiment of the invention that the elimination of the isolated signal parts occurs in that the signal amplitudes allocated to the corresponding coordinates are set to a value equal to zero. This allocation of the value zero has the advantage that inquiries to be carried out in a following, digital processing can be implemented with extremely little computational expense. A high processing speed is achieved as a result thereof, this allowing extremely high transmission speeds, particularly given an employment of the apparatus in image reproduction technology equipment or in the field of telecommunications.

It is provided in another preferred embodiment of the invention that at least the selector is implemented as a digital computer program. This implementation exhibits considerable advantages, particularly given the employment of processors specialized for image processing, since separate hardware is saved and components specifically suited for the implementation of vector and matrix operations can be utilized. It is also thereby becomes possible to filter extremely finely structured image originals with a short processing time.

Further details of the present invention derive from the following, detailed description and from the attached drawings wherein a preferred embodiment of the invention is shown by way of example.

BRIEF DESCRIPTION OF THE DRAWINGS

FIG. 9 is a signal curve at the output of the interpolator; a

DESCRIPTION OF THE PREFERRED EMBODIMENTS

Figure 1:
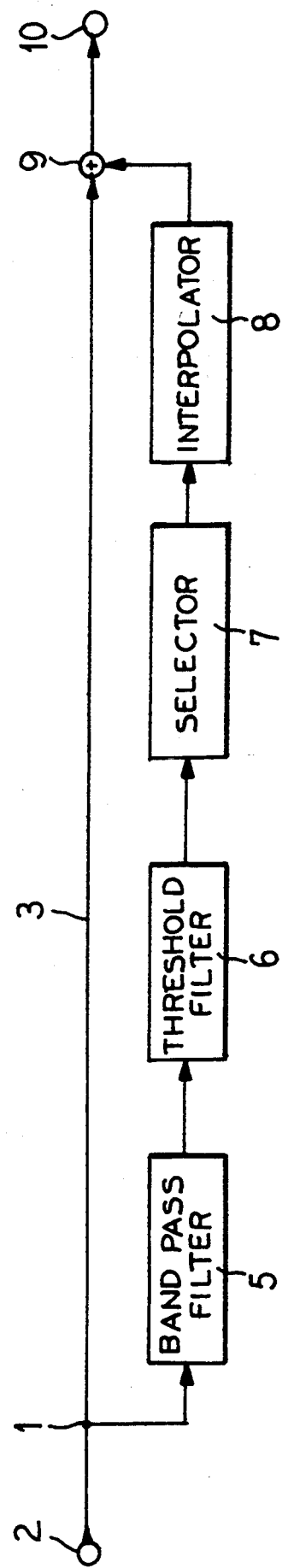
FIG. 1 is a block circuit diagram of an apparatus for filtering signals.

The apparatus for filtering signals that is shown in FIG. 1 is essentially composed of a separating filter 1 in which an input signal that is supplied to an input 2 is conducted both to a through branch 3 as well as to a filter branch 4. A delay unit 3A, inserted in branch 3, delays the input signal so that it is isochronic to the output signal from the filter branch 4, as is well known in the prior art as described in DE-A-34 23 112 discussed previously. A band-pass filter 5, a threshold filter 6, a selector 7 as well as an interpolator 8 are arranged in the filter branch 4. The band-pass filter 5, the threshold filter 6, the selector 7 and the interpolator 8 are arranged following one another as a series circuit within the filter branch 4. An output of the interpolator 8 is connected to a combiner or adder 9 wherein the input signal forwarded via the through branch 3 is additively combined with the filtered signal. The combination signal is available at an output 10.

The input signal can be an image signal, an image reproduction technology signal, a telecommunications system signal, or a telefax equipment image signal.

Figure 2:
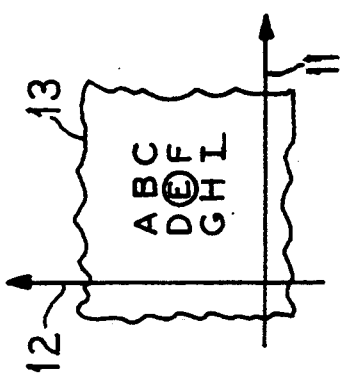
FIG. 2 is a schematic illustration of amplitude values that allocated to coordinates of a rastered plane.

High-frequency parts allocated with great probability to noise parts as well as constant parts of the input signal are first filtered out in the band-pass filter 5. The signal edited this way in the band-pass filter 5 is supplied to the threshold filter 6. The threshold filter 6 preferably comprises a threshold both with respect to positive signal parts as well as with respect to negative signal parts that is the same in terms of amount. The threshold is defined dependent on those parameters that determine the signal-to-noise ratio of the signal. Given images, for example, the image sharpness and the scanning resolution can be taken into consideration. The band-pass filter 5 works as a two-dimensional band-pass filter. This means that components in the direction of different coordinate axes 11, 12 of a reference plane 13 are taken into consideration in the filtering. FIG. 2 shows an example of an arrangement of amplitude values that are allocated to coordinates within the reference plane.

Due to the charging with the threshold filter 6, all those parts to which an amplitude whose amount is lower than the prescribed threshold allocated are thereto filtered out from the signal that departs the band-pass filter 5. For simplifying a following evaluation, the signal parts eliminated at the threshold filter 6 have the value zero allocated to them. Fundamentally, however, it is also possible to provide amplitudes different from zero with a low amplitude height.

The signal departing the threshold filter 6 is supplied to the selector 7. An analysis is carried out here to see whether coordinates exist within the reference plane 13 to which an amplitude unequal to zero has been assigned and whose immediate neighboring coordinates are provided with an amplitude equal to zero. It can be assumed with high probability when locating such coordinates that the corresponding signal parts are a matter of disturbances. The value zero, or, respectively, a value that does not substantially deviate from zero, is therefore allocated to the coordinates that have been found.

Figure 3:
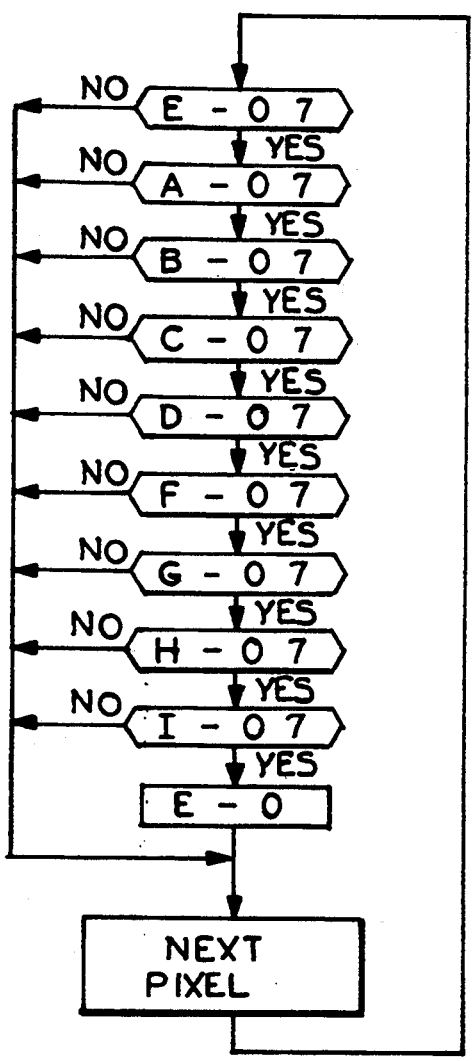
FIG. 3 is a flowchart directed to the elimination of isolated signal parts.

An example for the execution of the selection process given an amplitude allocation within the reference plane 13 of FIG. 2 is shown in FIG. 3. A check 23 is first carried out for the coordinate E to see whether it has a value unequal to zero. When this is not the case, a check 33 of a next picture element can immediately occur. When an amplitude unequal to zero is allocated to the coordinate E, then the coordinates in its immediate environment are successively checked (see flow chart steps 23-31) until an amplitude value unequal to zero has been found. When such an amplitude value is located, the next picture element is likewise analyzed (step 33). When all coordinates in the immediate environment of the coordinate E have the amplitude value zero, then the amplitude allocated to the coordinate E is set to zero (step 32). It is fundamentally possible to take the information with respect to the amplitude values of specific coordinates acquired within a preceding cycle into consideration in the check of a next picture element. Due to the checking for a value equal to zero, or, respectively, for a value unequal to zero, it can be implemented with extremely little time expenditure in a digital realization. However, the execution shown in FIG. 3 can also be run for every individual picture element with extremely little time expenditure.

Figure 4:
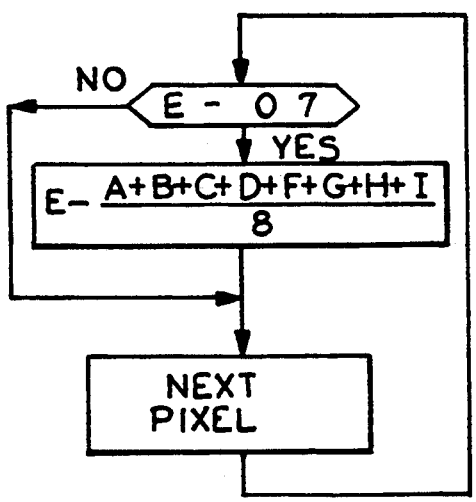
FIG. 4 is a flowchart directed to the reconstruction of signal parts with the assistance of a two-dimension interpolator.

The signal leaving the selector 7 is supplied to the interpolator 8. The interpolator 8, which acts two-dimensionally like the band-pass filter 5, is operated in a switched mode and makes it possible to reconstruct contour progressions with low amplitude. FIG. 4 shows a flowchart for illustrating the operation of the interpolator 8. Based on a signal structure according to FIG. 2, a check 34 is first carried out to see whether the amplitude allocated to a specific coordinate has the value zero. When this is the case, then the amplitude values of the coordinates in an immediate environment thereto are added and are divided by the plurality of added signals (step 35). This average value is subsequently allocated to the coordinate to be investigated. Thereafter the process is repeated for the coordinate of the next pixel (step 36). It is fundamentally possible to undertake a weighted interpolation dependent on preferred contour directions within the information structure. Dependent on the weighting factors, the amplitude values of the neighboring coordinates thereby enter into the formation of the average with different weight. In addition to taking only the immediate neighboring coordinates into consideration, it is also possible to evaluate larger fields within the signals. For example, it is thereby also possible to take slopes or curvatures in the signal curve into consideration.

The output signals of the interpolator 8 are added to the delayed but unmodified input signal in the combiner 9. A signal that contains all information of the input signal and nonetheless has a significantly greater signal-to-noise ratio thus is present at the output 10.

Figure 5:
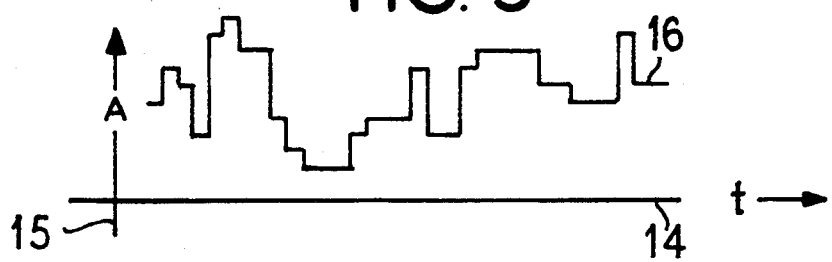
FIG. 5 is a signal curve of an input signal to be filtered.
Figure 6:
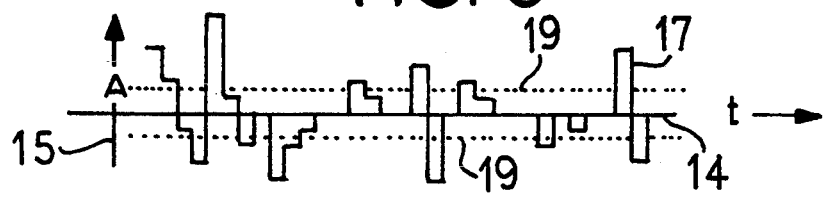
FIG. 6 is a signal curve at the output of the band-pass filter.
Figure 7:
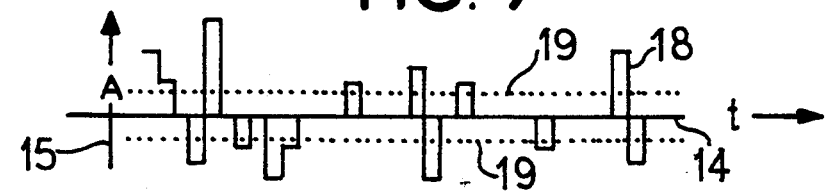
FIG. 7 is a signal curve at the output of the threshold filter.
Figure 8:
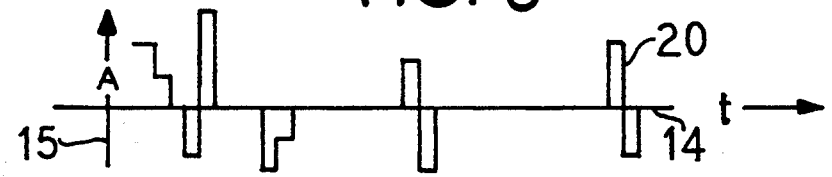
FIG. 8 is a signal curve at the output of the selector.
Figure 9:
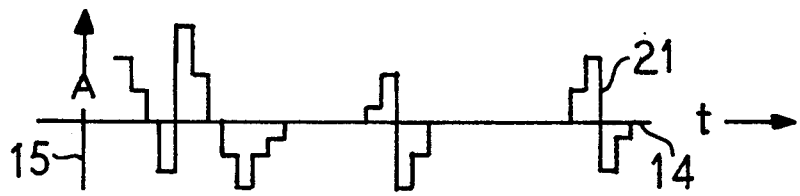
Figure 10:
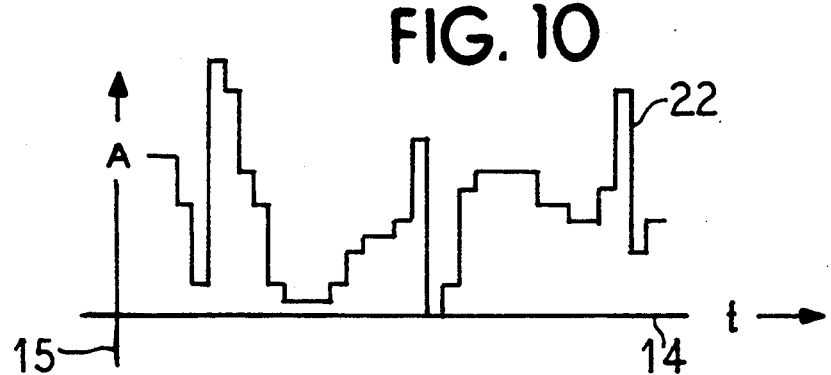
FIG. 10 is a curve of the output signal after an addition of the input signal and of the filtered signal.

FIGS. 5 through 10 show typical signal curves for illustrating the functioning of the method and of the apparatus. All signal curves area respectively illustrated in a coordinate cross that is formed of a time axis 14 and of an amplitude axis 15. FIG. 5 shows an input signal curve 16 present at the input 2. FIG. 6 shows an output signal 17 of the band-pass filter 5 from which high-frequency parts and constant parts have already been eliminated. FIG. 7 shows an output signal 18 of the threshold filter 6. It may be seen that signal parts still shown in FIG. 6 and having an amplitude below a threshold 19 have been eliminated. FIG. 8 shows the output signal 20 of the selector 7 with which those signal parts in whose immediate proximity within the reference plane 13 no amplitude values equal to zero were present have been eliminated. The output signal 20 of the selector 7 shown in FIG. 8 is reshaped in the interpolator 8 to form the output signal 21 shown in FIG. 9. Useful signal parts with a low amplitude are reconstructed here by an interpolation between amplitude values of neighboring coordinates within the reference plane 13. The output signal curve 22 shown in FIG. 10 that is available at the output 10 arises due to an addition of the output signal 21 and of the input signal curve 16 in the combiner 9. The signal curves shown only with respect to one of the coordinate axes 11, 12 in FIGS. 5 through 10 for greater clarity correspond—essentially due to the two-dimensional function of the band-pass filter 5 and of the interpolator 8—to a signal curve with respect to arbitrary orientations within the reference plane 13. In addition to an elimination of the signal parts having an amplitude below the threshold 19, it is also possible to implement an intensification of the remaining signal parts in the threshold filter 6 and to thereby contribute to a further improvement of the signal-to-noise ratio.

Employment of the method and of the apparatus can occur in a multitude of applications wherein signal curves allocated to a reference plane are to be filtered. A typical example is the filtering of images in reproduction technology. However, numerous other possible applications are conceivable. In image processing, for example, these can be quality enhancement of image information transmitted via telefax equipment or picture telephones; however, it is also possible to subject video pictures, images recorded on video apparatus or satellite images to a filtering in order to work-out noise-infested contours within the images. In general, however, the method and the apparatus can also be employed outside the field of image processing. The problem that the useful signal parts are superimposed by disturbances arises everywhere in the evaluation of signal curves that can be allocated to a surface. As an example, let the registration of a temperature profile of a surface be recited here. Given parameter constellations that are presented in a parameter space of larger dimension, it is either possible to respectively subject three-dimensional sub-structures to a filtering or to implement the processing algorithms described, for example, in FIGS. 3 and 4 vectorially such that the parameters to be taken into consideration in the respective operations are arranged in vectors and matrices of suitable dimensioning.

Although various minor changes and modifications might be proposed by those skilled in the art, it will be understood that I wish to include within the scope of the patent warranted hereon all such changes and modifications as reasonably come within my contribution to the art.

We claim as our invention:

1. A method for filtering signals, comprising the steps of: feeding an input signal to a signal input, and connecting the signal input both to a delay unit and to a filter branch, and combining outputs of the delay unit and filter branch at a signal output;

in said filter branch, filtering out constant parts and high-frequency parts of the input signal, by
  band-pass filtering the input signal;
  after the band-pass filtering, eliminating signal parts having an amplitude below a prescribable threshold;
  allocating signal amplitudes to a quantized, two-dimensional reference plane and, after eliminating the signal parts having an amplitude below said prescribable threshold, eliminating isolated signal parts within the reference plane; and
  thereafter implementing a signal reconstruction by interpolation for coordinates of the reference plane at which a signal amplitude of a filtered signal part is essentially equal to zero.

2. A method according to claim 1 including the step of implementing elimination of the isolated signal parts by allocation of an amplitude value of zero to corresponding coordinates of the reference plane.

3. A method according to claim 1 including the steps of implementing the elimination of the isolated signal parts in a region of a selector which checks at least those amplitude values that are allocated neighboring coordinates to a working coordinate to see whether their amplitude value is equal to zero, and setting to zero the amplitude value of the working coordinate in case of a complete locating of amplitude values equal to zero.

4. A method according to claim 1 including the step of implementing said signal reconstruction in a region of an interpolator that adds amplitude values allocated at least to immediate neighboring coordinates of a working coordinate, the interpolator dividing by a number of values taken into consideration and allocating an average found this way to the working coordinate when this is provided with an amplitude value equal to zero.

5. A method according to claim 1 wherein the input signal is an image signal.

6. A method according to claim 1 wherein the input signal is an image reproduction technology signal.

7. A method according to claim 1 wherein said input signal is a telecommunications systems signal.

8. A method according to claim 1 wherein the input signal is a telefax equipment image signal.

9. A method according to claim 1 including the steps of implementing a two-dimensional interpolation for reconstruction of useful parts having a low amplitude, the implementation being performed at least between amplitude values of the filtered signal whose coordinates within the reference plane are arranged in an intermediate environment of a reference coordinate to be processed in the reconstruction.

10. A method according to claim 9 including the steps of employing a quantization of the reference plane with respect to coordinate axes thereof extending perpendicularly, relative to one another in said two-dimensional interpolation and in a two-dimensional band-pass filtering, and evaluating at least eight coordinate points arranged in an immediate environment of a reference coordinate with respect to amplitude values allocated to them.

11. An apparatus for filtering signals, comprising:
a signal input connecting via a delay unit to a first input of a combiner and to an input of a filter branch whose output connects to a second input of the combiner, an output of the combiner connecting to a signal output;
a frequency-dependent filter in said filter branch connected to said filter branch input and designed as a band-pass filter, said band-pass filter allocating signal amplitudes to a quantized two-dimensional reference plane;
a threshold filter connected to and following the band-pass filter;
a selector connected to and following the threshold filter for eliminating isolated signal amplitudes; and
an interpolator connected to and following the selector for reconstructing signal curves.

12. An apparatus according to claim 11 wherein said band-pass filter comprises a two-dimensional filter effective with respect to independent coordinate axes of said reference plane.

13. An apparatus according to claim 11 wherein said selector has a zero comparator for checking amplitudes allocated to selected coordinates within said reference plane for a value equal to zero.

14. An apparatus according to claim 11 wherein at least one of said selector or interpolator comprises digital components.

15. An apparatus according to claim 11 wherein at least one of said selector or interpolator is designed as an algorithm capable of being run on a digital computer.

16. An apparatus according to claim 11 wherein said combiner additively combines the filtered signal with the unfiltered input signal and outputs contour information.

17. An apparatus for filtering signals, comprising:
a signal input connecting via a delay unit to a first input of a combiner and also to an input of a filter branch whose output connects to a second input of the combiner, an output of the combiner connecting to a signal output;
said filter branch comprising a series connection of
a band-pass filter for filtering out high-frequency parts representing noise as well as constant parts of the input signal;
a threshold filter connected to the output of the band-pass filter for filtering out all signal parts having an amplitude lower than a prescribed threshold of the threshold filter;
following the threshold filter, a selector having signal amplitudes allocated to a quantized two-dimensional reference plane and for eliminating isolated signal parts within the reference plane from a signal output from the threshold filter; and
an interpolator connected to an output of the selector for implementing a signal reconstruction by interpolation.

* * * * *